US010513086B2

(12) United States Patent
Bor

(10) Patent No.: US 10,513,086 B2
(45) Date of Patent: Dec. 24, 2019

(54) TIRE BUILDING DRUM FOR THE MANUFACTURE OF TIRES

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventor: Gerard Bor, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 407 days.

(21) Appl. No.: 15/123,541

(22) PCT Filed: Mar. 5, 2015

(86) PCT No.: PCT/EP2015/054656
§ 371 (c)(1),
(2) Date: Sep. 2, 2016

(87) PCT Pub. No.: WO2015/132351
PCT Pub. Date: Sep. 11, 2015

(65) Prior Publication Data
US 2017/0080657 A1  Mar. 23, 2017

(30) Foreign Application Priority Data
Mar. 7, 2014 (FR) ...................... 14 51866

(51) Int. Cl.
*B29D 30/24* (2006.01)
(52) U.S. Cl.
CPC ......... *B29D 30/247* (2013.01); *B29D 30/244* (2013.01); *B29D 30/248* (2013.01)

(58) Field of Classification Search
CPC .... B29D 30/24; B29D 30/244; B29D 30/245; B29D 30/246; B29D 30/247; B29D 30/248
See application file for complete search history.

(56) References Cited

U.S. PATENT DOCUMENTS 3,778,326 A    12/1973  Gazuit
4,149,927 A     4/1979  Lauer, Jr.
(Continued)

FOREIGN PATENT DOCUMENTS

DE    1579257 A  *  8/1970
FR    2509663 A1    1/1983
(Continued)

*Primary Examiner* — Geoffrey L Knable
(74) *Attorney, Agent, or Firm* — Dickinson Wright PLLC

(57) ABSTRACT

The building drum includes a support (20), a central shaft (30) and an outer circumferential surface coaxial with the axis of rotation of the drum. The building drum also has a principal cylindrical surface (100) axially bounded by a shoulder (101) extended by a lateral protuberance (102) for receiving the products which have to be assembled. Several segments together define the principal cylindrical surface, and those segments are being divided into first and second groups of adjacent segments (103a, 103b) mounted so as to move between a first position in which they are circumferentially juxtaposed and a second position in which the adjacent segments are radially offset. Several adjacent elbow levers (140) form the shoulder (101) and the protuberance (102) in the expanded position of the drum and each elbow lever (140) is mounted with articulation on the segment (103a, 103b) and on the support (20).

16 Claims, 5 Drawing Sheets

(56) References Cited

U.S. PATENT DOCUMENTS

| | | | |
|---|---|---|---|
| 4,425,180 A * | 1/1984 | Samokhvalov | B29D 30/248 |
| | | | 156/415 |
| 4,780,170 A | 10/1988 | Landsness | |
| 5,047,108 A | 9/1991 | Byerley | |
| 2012/0111480 A1* | 5/2012 | Baldoni | B29D 30/244 |
| | | | 156/110.1 |

FOREIGN PATENT DOCUMENTS

| | | | |
|---|---|---|---|
| JP | 07-024931 A * | 1/1995 | |
| WO | 02053355 A2 | 7/2002 | |

* cited by examiner

TIRE BUILDING DRUM FOR THE MANUFACTURE OF TIRES

CROSS-REFERENCE TO RELATED APPLICATIONS

The present invention claims priority to PCT International Patent Application Serial No. PCT/EP2015/054656 filed Mar. 5, 2015 entitled "Tyre Building Drum For The Manufacture Of Tyres," which claims the benefit of FR Patent Application Serial No. 1451866 filed Mar. 7, 2014, the entire disclosures of the applications being considered part of the disclosure of this application and hereby incorporated by reference.

BACKGROUND OF THE INVENTION

1. Field of the Invention

This disclosure relates to a building drum for the manufacture of tires.

The disclosure relates more particularly to a building drum having shoulders on which the bead wire or bead wires are deposited in the course of assembly through a lateral approach towards the said shoulders. Through such a drum, different rubber-based plies, including a carcass ply, can be placed in succession on the outer receiving cylindrical surface and bead wires and semi-finished products or profiled elements based on a rubber mixture can be positioned on the shoulders located in the vicinity of the axial extremities of the receiving surface and held there assembled, together with the rubber-based plies previously positioned and folded back at the shoulders. The bead wires and the semi-finished products are held against the shoulder by adhesively bonding the products together.

Because the carcass formed upon it shrinks from the drum, the circumference of the drum has to be reduced to release the carcass and ensure that there is release between the outer circumference of the drum and the inner circumference of the carcass. The drum must therefore be radially retractable so that the green tire so assembled can be withdrawn. Such a drum generally comprises a plurality of segments which can move radially between a deployed or working position of the drum and a retracted position. In addition to this, some tire carcasses have inclined shoulders which also make it necessary for segments to be withdrawn axially.

2. Related Art

Thus publication WO 02/053355 in the name of the applicants describes such an expandable building drum with inclined shoulders. The building drum comprises a body mounted to rotate on a central shaft, comprising a cylindrical assembly surface formed of several shoulder segments. The segments are circumferentially adjacent, they are provided with covering plates to ensure an outer surface of circular shape, and are mounted so that they can move radially and axially between an expanded position of the drum and a retracted position of the drum. One disadvantage of this drum is the use of vacuum valves connected to a pneumatic circuit with a view to ensuring that the components are held at the shoulders, which requires an additional feed source, complicates construction of the drum and renders operation less reliable. Another disadvantage of such a drum relates to activation of the segments, which is brought about through a connecting rod that follows the profile of a cam in the deployed position, return to the retracted position being brought about by a resilient membrane enveloping the segments, which gives rise to concerns about reliability as the membrane wears or ages. In addition to this, the drum comprises many segments, which increase in number with the difference in diameter between the working and retracted positions of the drum. Because of this, this drum is not suitable for building small diameter carcasses, or those having a significant difference between the diameter of the outer cylindrical surface and the diameter measured at the beads thereof.

One solution has been described in document FR 2 509 663 in which the drum comprises two different groups of segments, of the keystone and voussoir type, arranged successively in a circumferential direction. The segments are mounted so as to move between a deployed position of the drum, in which all the segments are circumferentially adjacent, and a retracted position of the drum in which the segments are radially offset and retracted. Each segment is connected by articulated arms, activating a central slide which can move axially, two coaxial slides being provided within the drum, one connected to the keystone segments and the other to the voussoir segments. The drum also comprises means for moving the slides.

The shoulders are connected to the arms activating the segments via a mechanism with a rack and toothed sector, a mechanism which ensures that they move axially in relation to the segments and at the same time, so that the green tire built on the drum can be removed. Adjustment of all the racks to achieve segments which are concentric and parallel to the axis of the drum proves to be difficult.

In a variant the drum comprises shoulders mounted so as to be articulated on the segments. Each shoulder is mounted using a tie rod, which is articulated on an articulated element mounted with a tension spring in relation to the segment. The articulated element is activated by means of a toothed sector on an activating arm of a segment which engages an articulated cam and which pushes the shoulder tie rod outwards in the deployed position of the drum. Such a tensile spring solution gives rise to reliability problems if the spring should jam or break.

As the shoulders are kinematically connected to the segments, radial movement of the segments simultaneously brings about movement of the shoulders, either in an axially sliding direction or pivoting about an axis perpendicular to the axis of the drum, to release the shoulders with respect to the parts forming the bead of the green tire.

However the mechanism activating the segments and shoulders of the drum according to this document is complex and bulky, which has consequences for the dimensions, reliability and cost of the drum. In addition to this, because of the large number of articulated parts of which the drum is made up, significant chatter and operating play have to be taken into account, play which becomes greater as the mechanisms wear.

SUMMARY OF THE INVENTION AND ADVANTAGES

The disclosure is intended to overcome all of these disadvantages.

Over and above, there is still a need for a retractable building drum with shoulders of sufficient height to allow a green tire whose beads are made only by a lateral approach, without movement of the rubber at the shoulder of the drum, to be built.

This objective is accomplished through the disclosure which provides an building drum for the building of a tire comprising a support, a central shaft and an outer circumferential surface coaxial with the axis of rotation of the drum, and comprises a principal cylindrical surface axially bounded by a shoulder, extended by a lateral protuberance receiving the products being assembled, several segments together defining the principal cylindrical surface, the segments being divided into first and second groups of adjacent segments mounted to move between a first position in which they are circumferentially juxtaposed and a second position in which the adjacent segments are radially offset, and wherein, in the expanded position of the drum, several adjacent elbow levers form the shoulder and the protuberance, and in that each elbow lever is mounted with articulation on the segment and on the support.

Such an elbow lever comprises at least two rigid arms forming a given angle between them. The elbow lever comprises a shape which, by revolution about the axis of the drum, defines the surface of the shoulder and that of the lateral protuberance of the building drum, surfaces which are coaxial with the outer cylindrical surface and the axis of rotation of the drum. Such an elbow lever is sufficiently rigid to be able to take up the stitching forces applied to the shoulders during assembly without deformation, so that the components adhere together.

Articulated mounting of the elbow lever on the edge of each segment and on the support allows the lateral part of the drum to tilt through a large amplitude when the lever is caused to pivot about the support during radial retraction of the segments and to return to its retracted position, doing so in a reliable operating manner. This means that the shoulder of the drum can be of great height, while limiting play and chatter in the articulations. Also, this tilting of the elbow lever makes it possible to remove the carcass without stressing the assembled components or causing them to slide between each other.

Such a drum makes it possible to construct the bead zone with only lateral approach of the components onto the drum, without stressing these components (that is without folding or deforming one of the components at the shoulder) when assembling the carcass on the drum, while preventing the components from sliding between themselves when the carcass is extracted. The bead zone of the carcass or green tire so obtained is close to its final shape.

Preferably the drum according to the disclosure comprises means positively activating pivoting of each elbow lever about an axis perpendicular to the axis of the drum.

By positive pivoting activating means are meant means comprising a moving mechanical member which causes the elbow lever to pivot through direct contact or through the intermediary of rigid elements when the segments move towards the expanded or retracted position of the drum. Such positive activation makes it possible to ensure that the lever will pivot reliably, so that the articulation connecting the elbow lever to the extremity of the segment can pass from a first position in which it is located in the vicinity of the outer cylindrical surface of the segment and overlies the second articulation connecting the lever to the support, to a second position in which it descends at least substantially to the same level as the second one.

According to one advantageous aspect of the disclosure, the segments comprise extremity parts which can move axially and radially between a first position in which the principal cylindrical surface of the segments has a diameter and axial length greater than those in a second position.

Preferably the segments comprise central parts supported by means of radial arms by a central collar mounted on the central shaft of the drum and the extremity parts are mounted so as to slide in relation to the central parts.

According to the disclosure the elbow lever is a one-piece rigid part having a general Z shape. Such a lever comprises three arms, the first and the second defining the surfaces of the shoulder and the lateral protuberance, whereas the third is used for pivoting activation.

Advantageously the elbow levers can move by pivoting about an axis perpendicular to the longitudinal axis of the drum when driven by a collar which can move in translation along the central shaft. Axial movement of a collar parallel to the longitudinal axis of the drum engaging one of the extremities of each lever directly brings about pivoting movement of the elbow lever about a pivot axis of the support which is perpendicular to the longitudinal axis of the drum.

According to one advantageous aspect of the disclosure, each collar is connected to a group of segments and the collars are mounted at a distance from each other on the central shaft. This makes it possible for each group of segments to be activated independently.

Preferably the drum according to the disclosure comprises activating means which move the collars towards or away from each other symmetrically.

According to one advantageous aspect of the disclosure the activating means comprise a stop plate of one piece with the collar and mounted with predetermined axial play in relation to the collar. This makes it possible to activate and move a first group of segments.

According to the disclosure, the elbow lever comprises a substantially radial arm in an expanded position, having a height of 50 mm or more. The height of the radial arm of the elbow lever defines the height of the shoulder of the drum. A drum having a shoulder of height over 50 mm can be used to build the bead zone of a green tire having dimensions larger than 16" only through lateral approach of the components on the drum, without stressing these components (that is without folding or deforming one of the components) when assembling the carcass on the drum, while preventing the components from sliding between themselves when the carcass is extracted.

BRIEF DESCRIPTION OF THE DRAWINGS

The disclosure will be better understood through the description below, which is based on the following figures.

DETAILED DESCRIPTION OF THE ENABLING EMBODIMENT

In the various figures identical or similar elements have the same reference number. Their descriptions are not therefore systematically repeated.

Figure 1A:
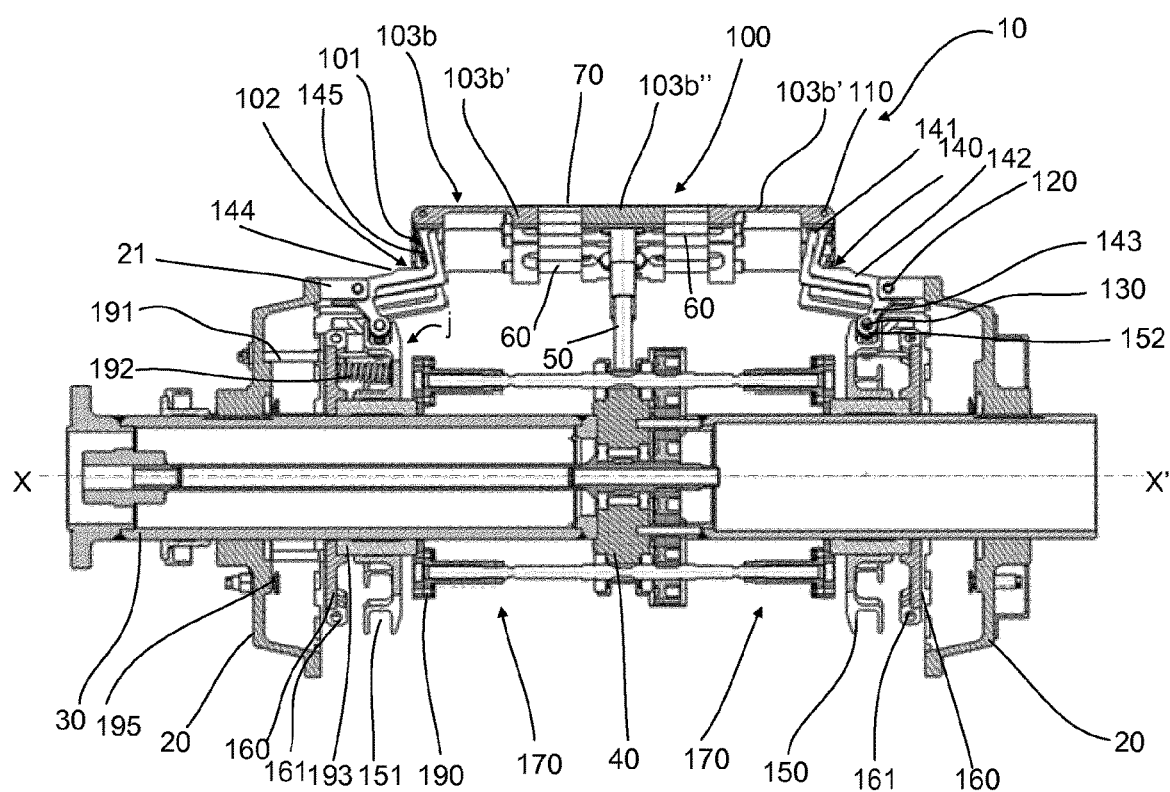
FIG. 1a is a view in axial cross section of the building drum according to the disclosure with only two adjacent segments illustrated in the expanded position.
Figure 1B:
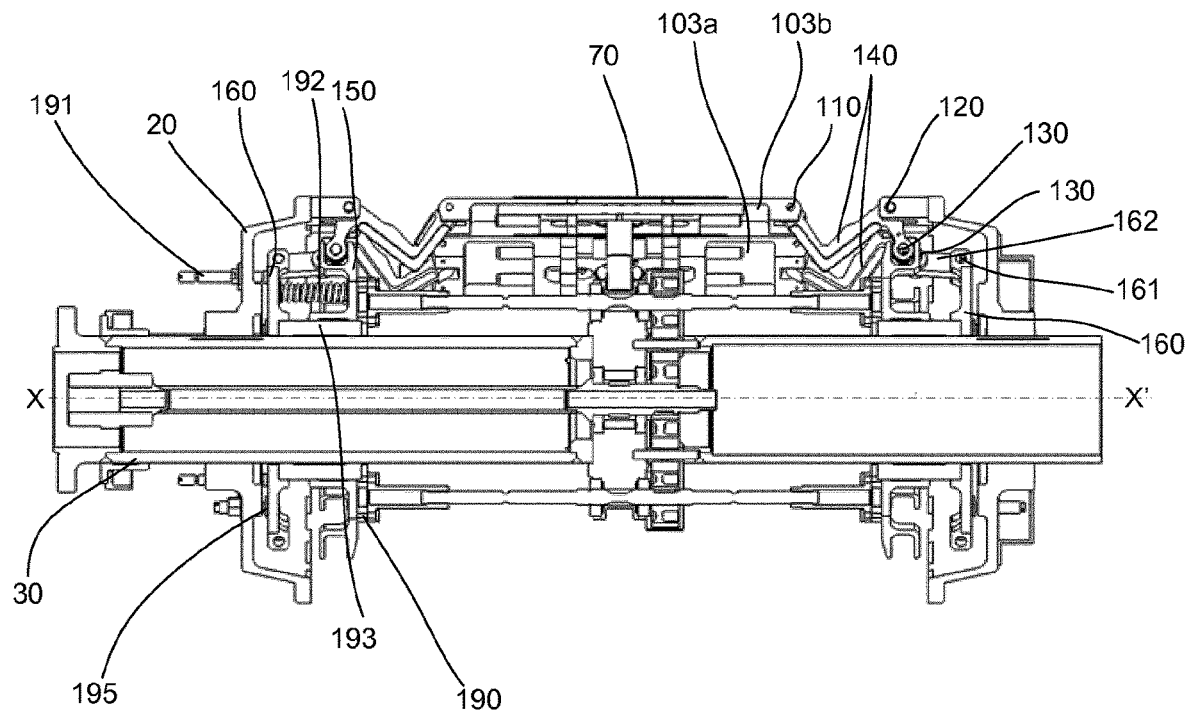
FIG. 1b is a view in axial cross section of the building drum according to the disclosure with only two adjacent segments illustrated in the retracted position.

FIGS. 1a and 1b show a building drum 10, comprising a support 20 of one piece with a central shaft 30. Central shaft 30 is driven in rotation together with support 20 about a longitudinal axis X-X' of the drum. Building drum 10 has an outer circumferential surface comprising a principal cylindrical surface 100 for receiving the products which have to be assembled, axially bounded by a shoulder 101 which is extended axially at its base by lateral protuberance 102. Principal cylindrical surface 100 comprises segments which are circumferentially juxtaposed in the expanded or working position of the drum and mounted so as to move radially and axially in relation to support 20 mounted on shaft 30. The segments allow drum 10 to be radially retracted so that carcasses built on the drum can be removed.

Figure 2A:
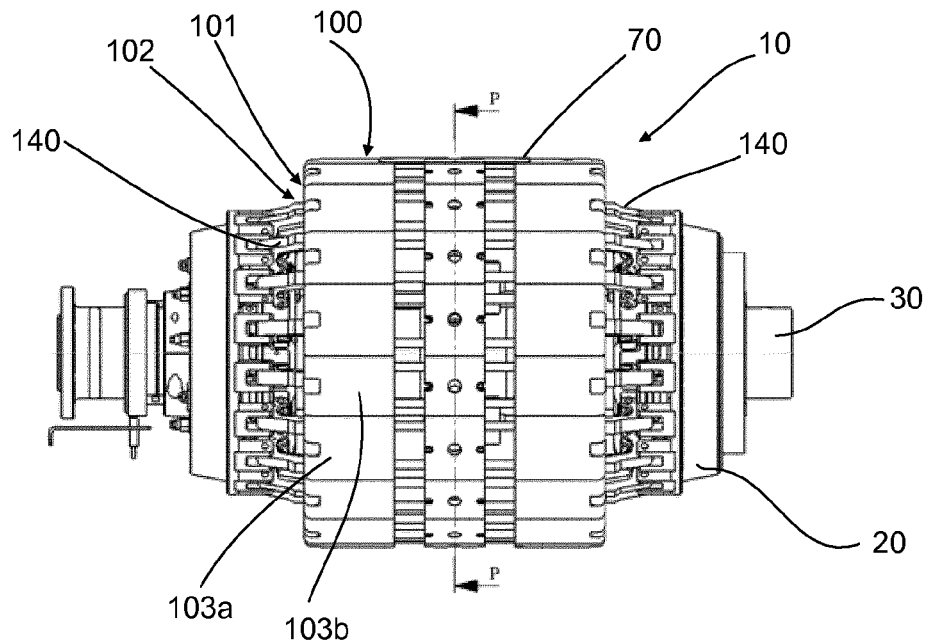
FIG. 2a is a front view and FIG. 2b is a view in transverse cross section of a drum according to the disclosure in the expanded position.
Figure 2B:
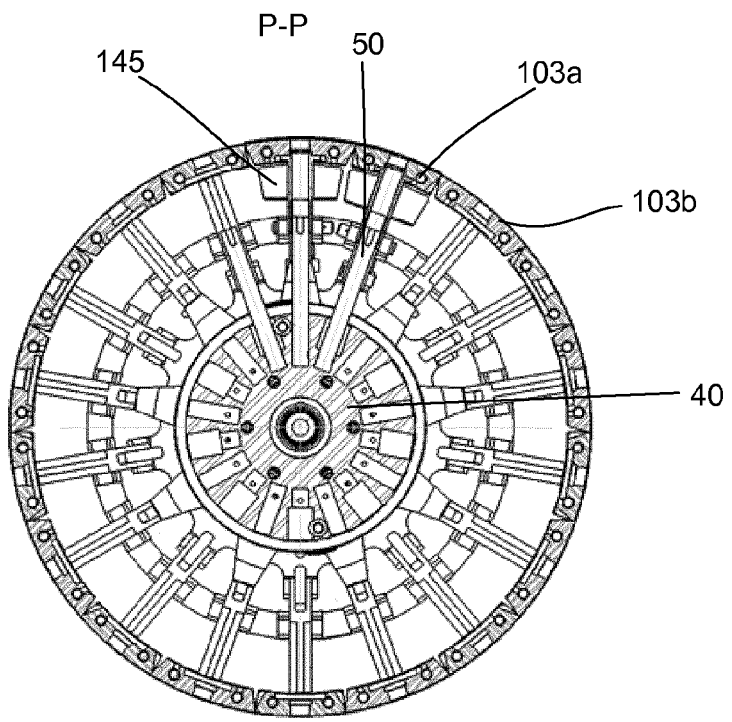
Figure 3A:
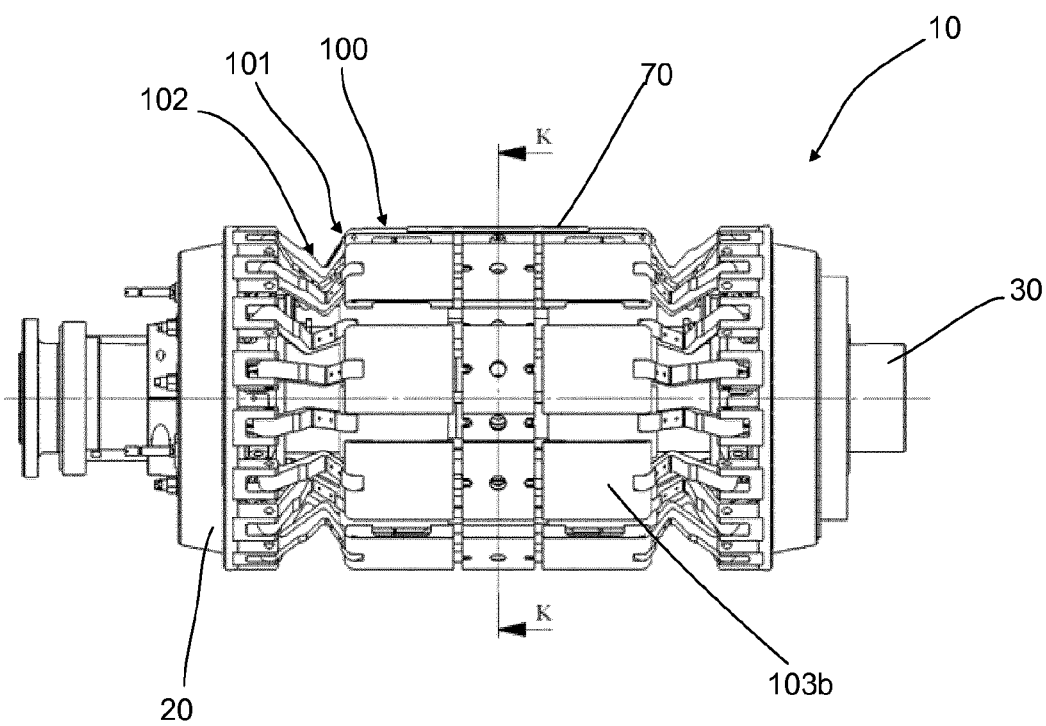
FIG. 3a is a front view and FIG. 3b is a view in transverse cross section of a drum according to the disclosure in the retracted position.
Figure 3B:
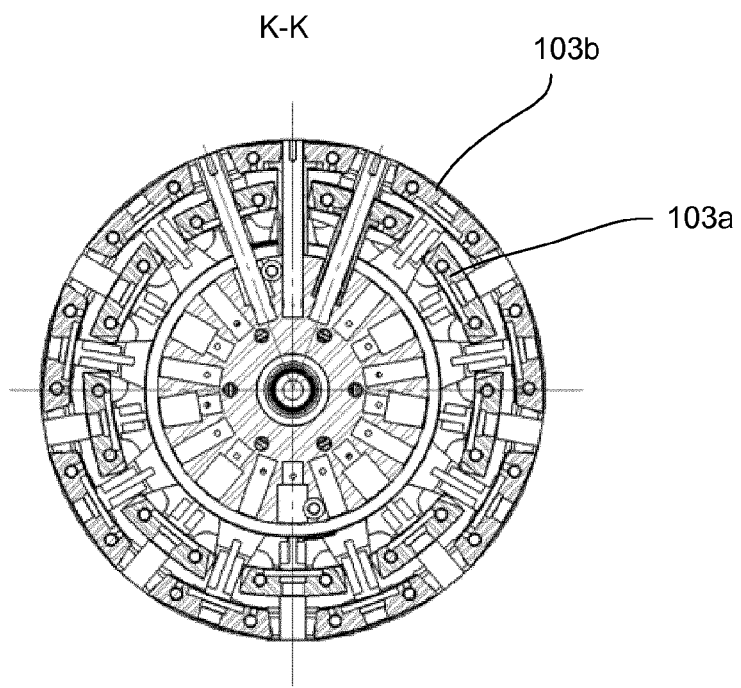

The segments comprise a set of several segments of a first and second group of alternating and circumferentially adjacent segments. Thus the circumferentially lateral surfaces of segments 103a of a first group of segments are convergent on the outside of the drum, these segments being called keystone segments and the circumferentially lateral surfaces of segments 103b of a second group are convergent within the drum, these segments being called voussoir segments. When they are activated the keystone segments are displaced radially inwards before the voussoir segments, between an expanded or working position of the drum which may be seen in FIGS. 2a and 2b, when the lateral surfaces of two adjacent segments are in contact, and a retracted position thereof which may be seen in FIGS. 3a and 3b, the diameter of the envelope comprising the outer surfaces of segments 103a being smaller than that of the envelope comprising the outer surfaces of segments 103b in the retracted or folded position of drum 10.

Drum 10 has a lateral protuberance 102 which is of one piece with shoulder 101, and has a generally cylindrical bearing surface of diameter less than that of principal cylindrical surface 100, so that shoulder 101 is released to allow bead wires and other semi-finished products intended to construct the bead zone to be fitted through a lateral approach.

According to the disclosure, several adjacent elbow levers 140 form shoulder 101 and lateral protuberance 102 of drum 10. Elbow lever 140 is a rigid piece which is mounted with articulation on the edge of a segment 103a, 103b and on support 20 of the drum. The lever thus comprises a first arm 141 which is substantially radial in the expanded position of the drum, extended laterally by a second arm 142. Arm 142 comprises a raised surface forming seat 144 located close to the junction with radial arm 141 and having a slope to assist the introduction of components. Seat 144 can receive and support the components of the green tire with a view to stitching. The envelope surface passing through first arms 141 forms shoulder 101 and that passing through arms 142, more particularly seats 144, forms lateral protuberance 102 of building drum 10. The angle formed between arms 141 and 142 of lever 140 may be a right angle, an acute or obtuse angle, and varies between 80° and 100°. When the shoulder is inclined outwards in relation to radial direction (or forms an acute angle with the lateral protuberance) the bead zone of the carcass obtained has a shape close to the final shape of the tire, and movements of the components are very limited, even non-existent. When the shoulder is inclined inward (forming an obtuse angle with the radial protuberance) the shape of the green tire is more suitable for pressing.

In the embodiment illustrated in the figures, support 20 is made in the form of an end flange attached to arm 30, two end flanges laterally bounding the internal volume of drum 10. U-shaped bridles 21 uniformly distributed over the circumference of the flanges serve as the support for the articulations for levers 140. Advantageously elbow lever 140 is a rigid part having a general Z shape with three arms, 141, 142, 143 mounted to pivot about three articulations 110, 120, 130 having axes perpendicular to longitudinal axis X-X' of the drum. Lever 140 has a first arm 141 forming a shoulder, a second arm 142 forming a lateral protuberance and a third arm 143 activating the pivoting movement. First articulation 110 connects lever 140 to a segment 103a, 103b, respectively, the second articulation 120 connects it to support 20, and third segment 130 connects it to a lateral collar 150, 160, which is coaxial with shaft 30 of drum 10. At each extremity of drum 10, two lateral collars 150, 160 are mounted to rotate with support 20 and with the possibility of longitudinal movement parallel to the X-X' axis of the drum. More particularly, collars 150, 160 are caused to move in translation in opposite directions through a screw and nut assembly 170, as will be explained below.

Each segment 103a, 103b is made in three parts: two end parts 103a', 103b' which are identical and symmetrical in relation to a median vertical plane and a central part 103a", 103b". The end parts of the segments are connected by elbow levers 140 to support 20, and the central parts of the segments are connected by radial arms 50 to a central collar 40 attached to shaft 30. The end parts of each segment are mounted so as to slide in translation on two longitudinal rods 60 which are fixedly mounted on the central part of the segment and extend on either side of the latter. Longitudinal rods 60 serve to hold and guide the end parts in relation to the central part of the segments. This assembly prevents tilting of the end parts of the segments and guides them parallel to central axis X-X' of drum 10 when the segments are moved between the two extreme positions of the drum. The central part of each segment supports a tile 70, which is fixedly mounted on the outer surface thereof and is of a length such as to ensure that it covers the gaps formed between the different parts of the segment when the latter moves between the two extreme positions of drum 10.

The kinematics of the drum and segments 103a, 103b will be explained with reference to FIGS. 4 to 6. The drum is driven in rotation about its central axis X-X' by a motor M1 which is coupled to shaft 30. A motor M2 is coupled to a transmission shaft 180 which causes a screw 171 to rotate via a set of gears 181. Screw 171 comprises two threaded ends, a first 172 having a left hand thread, and a second 173 having a right hand thread. Each threaded extremity acts together with a nut 174, 175 each attached to a collar 160 to allow collars 160 to move together or apart symmetrically according the rotation of screw 171.

In what follows a single axial moiety, in particular the equipment located on the left in FIGS. 4 to 6, will be described in order to explain the concept of the disclosure, the segments being symmetrically mounted with respect to a vertical median plane containing the longitudinal axis of radial arms 50.

Figure 4:
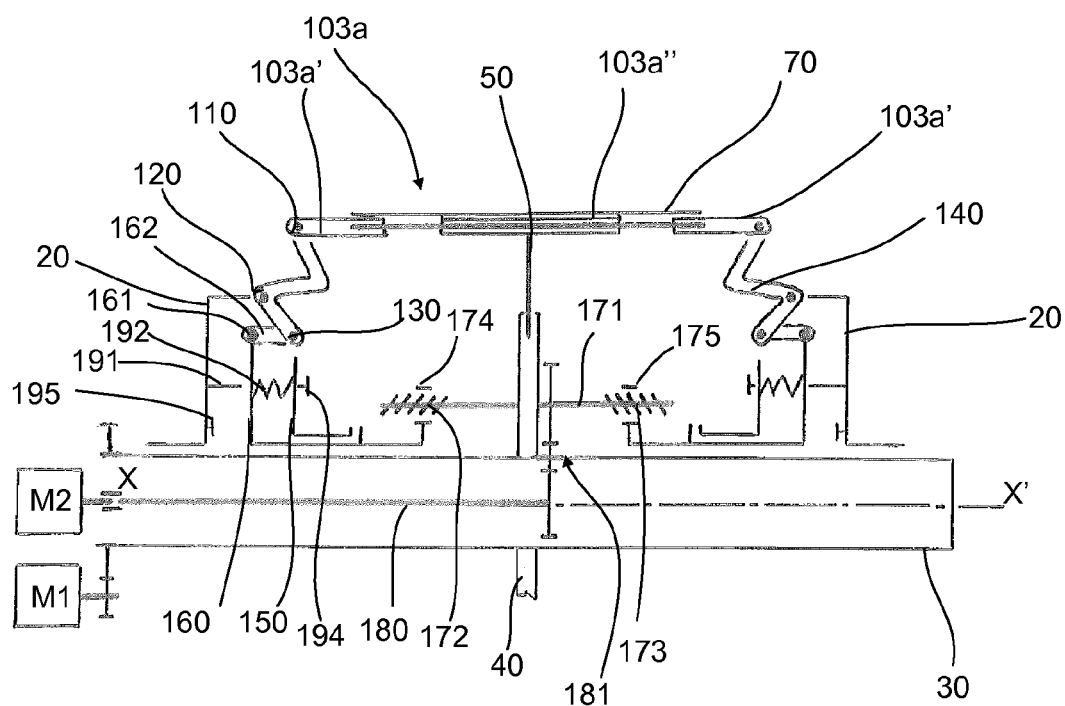
FIG. 4 is a kinematic diagram of the drum showing a segment of the first group of segments of the drum in the expanded position.
Figure 6:
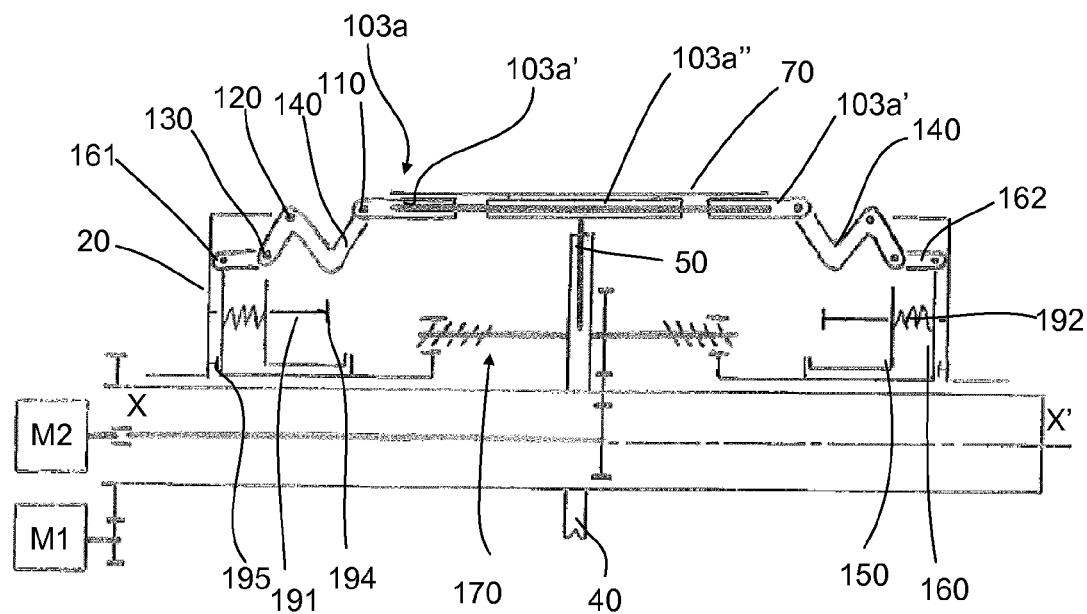
FIG. 6 is a kinematic diagram of the drum illustrating the segment in FIG. 4 in the retracted position.

FIG. 4 shows a keystone segment 103a in the expanded position of drum 10 and FIG. 6 the segment in the retracted position of the drum. End part 103a' of the keystone segment has the shape of a sector of a cylindrical shell having a thickness of a few mm to a few cm, the outer lateral edge of which is rounded and supports the axis of an articulation 110, about which is pivotally mounted elbow lever 140. Lever 140 is mounted to pivot on support 20 about an articulation 120 and it is also mounted with the possibility of pivoting about an articulation 130 in relation to collar 160. More particularly, collar 160 is in the shape of a disc whose periphery is provided with radial arms comprising bridles 161 (FIG. 1) for the attachment of linking bars 162, each bar being attached to collar 160 through a shaft 163. The pivot axis of articulation 130 lies at the end of linking bar 162 opposite that of the attachment to collar 160, longitudinal translational movement of collar 160 enabling lever 140 to pivot about axis of articulation 120, oscillations of articulation 130 being taken up by linking bar 162. In a variant the radial arms of collar 160 may be made of one piece with linking bars 162, in which case their ends terminate in guide grooves for rollers mounted on the ends of arms 143.

Figure 5:
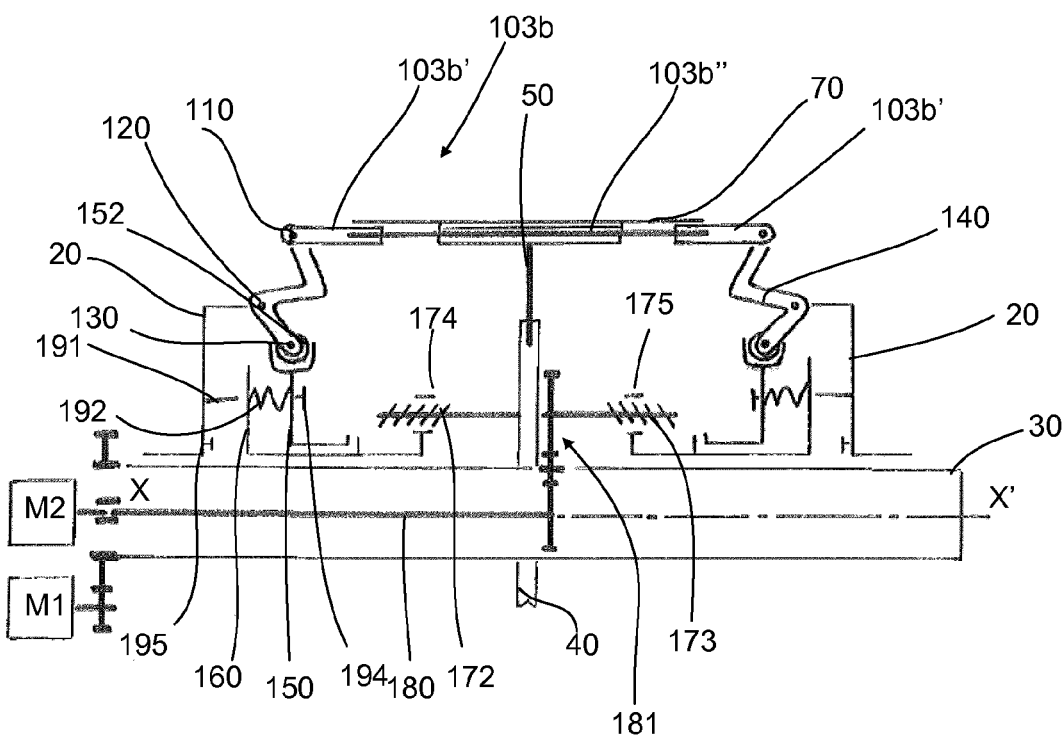
FIG. 5 is a kinematic diagram of the drum showing a segment of the second group of segments of the drum in the expanded position.
Figure 7:
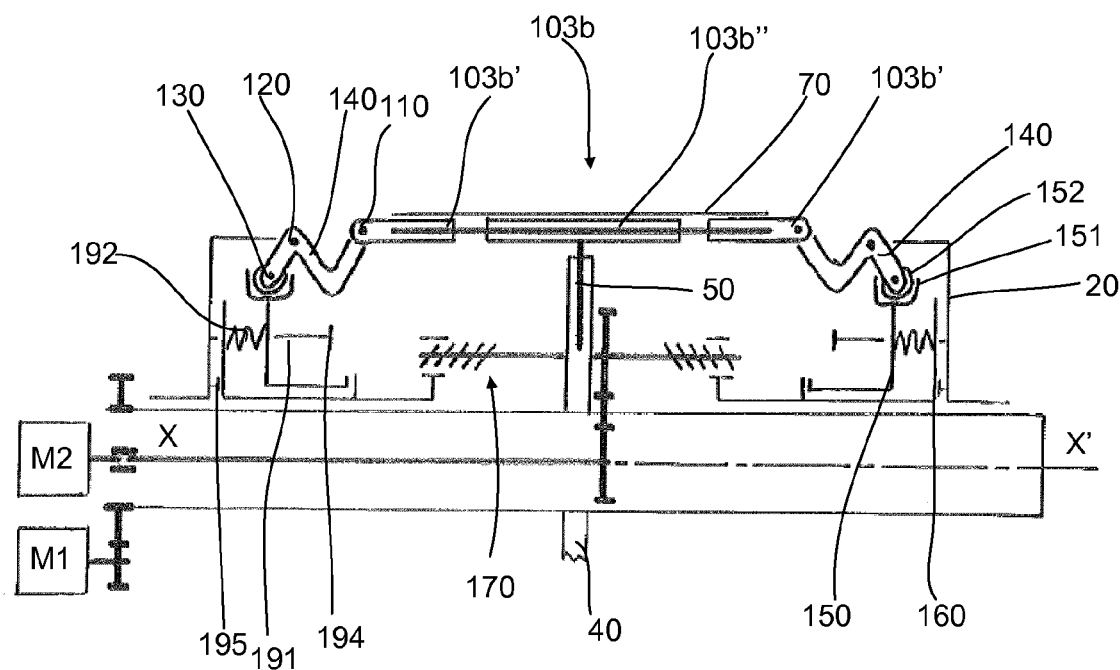
FIG. 7 is a kinematic diagram of the drum illustrating the segment in FIG. 5 in the retracted position.

FIG. 5 illustrates a voussoir segment 103b in the expanded position of drum 10 and FIG. 7 of the same segment in the retracted position of the drum. The end part 103b' of the voussoir segment has the shape of a sector of a cylindrical shell having a thickness of a few mm, the outer lateral edge of which comprises at its center an articulation axis 110, about which elbow lever 140 is mounted with the ability to pivot. Lever 140 is mounted to pivot on support 20 about an articulation 120 and it is also mounted with the ability to pivot about an articulation 130 in relation to collar 150. More particularly, collar 150 is in the general shape of a disc with several radial arms, the extremity (FIG. 1) of each arm forming a groove 151 for guiding a roller 152 mounted on the end of arm 143. Groove 151 has a U-shaped axial cross section and a width greater than that of roller 152. Groove 151 acts as a housing for receiving and guiding roller 152 during axial movement of collar 150.

Collars 150 and 160 are coaxial with the X-X' axis and are mounted so that their respective radial arms alternate circumferentially, one arm of one collar being angularly at an equal distance from the arms of the other collar. Keystone segments 103a and voussoir segments 103b are equipped with identical levers 140. In the expanded position of the drum, when the keystone and voussoir segments are circumferentially adjacent, as may be seen in FIGS. 4 and 5, the pivot axes of articulations 130 of all segments 103a, 103b lie in a same vertical plane passing through the longitudinal axis of the drum and are tangential to a common circle having a center passing through the X-X' axis of drum 10 and lie in the vertical plane.

Collars 150 and 160 are mounted so that they are able to move in longitudinal translation when they are activated by a stop plate 190 which is of one piece with the end of nut 174 of screw-nut device 170. Collar 150 is mounted with play on three rotation-preventing rods 191 parallel to the X-X' axis and uniformly distributed about its circumference. Rods 191 have a top stop 194 to limit the axial course of collar 150 in the expanded position of the drum. A bottom stop 195 is mounted as one piece with support 20 and limits the axial course of collar 160 in the retracted position of the drum. Collars 150, 160 are axially offset (that is in the direction of longitudinal axis X-X'), collar 160 occupying the position furthest from the center of drum 10. Stop plate 190 and collar 160 are fixedly mounted to the lateral ends of a bush 193. Collar 150 is mounted with the ability to slide on bush 193.

In the expanded position of drum 10 collars 150 and 160 are held at a predetermined distance from each other by means of compression springs 192, several springs 192 being distributed circumferentially between the two collars. A functional play "j", having a predetermined value, is provided between the front surface of stop plate 190 and that facing collar 150, this play enabling keystone segments 103a to be activated first.

In the embodiment illustrated in the figures, arm 141 of elbow lever 140 has a height of 50 mm, which is appropriate for the building of a 16" tire. Levers having arms 141 of greater height may be provided, adjusting the free volume within the drum to allow greater axial movement of collars 150, 160 and greater tilting of lever 140 so that articulation 110 can reach a position substantially lower than the diameter of articulation 120.

The drum illustrated in the figures comprises nine keystone segments 103a and nine voussoir segments 103b. The movement of segments 103a, 103b between the expanded and retracted positions of the drum is determined by the axial course of collars 150 and 160. Movement of the segments can be altered by adjusting top stop 194 and bottom stop 195.

In operation, motor M2 is first commanded to bring all the segments into the expanded position. In this position a carcass is built by stitching different rubber-based plies onto building drum 10 which is caused to rotate by motor M1. The bead wires and other rubber-based profiled elements are positioned on shoulder 101 through a lateral approach and are supported at their base on lateral protuberance 102. The lateral surfaces of levers 140 are advantageously covered with plates 145 fixedly mounted thereupon so as to constitute a substantially continuous laying surface on shoulder 101, on which the layers of rubber can be supported during stitching, so that they adhere to each other.

When building of the carcass is complete, motor M2 is commanded to be activated in the opposite direction to collapse the segments. Movement of screw-nut device 170 moves stop plate 190 pushing collar 160 in the direction of the lateral flange opposite it, which, through the pivoting of levers 140 initiates inward radial movement of keystone segments 103a. Thus only keystone segments 103a are activated during travel of stop plate 190 through the distance of play "j"; subsequently the latter simultaneously pushes collars 150 and 160 with the result that set of keystone segments 103a and voussoir segments 103b is moved radially towards the interior of the drum. At the end of the travel of the axial movement of stop plate 190 all the segments are radially retracted, the keystone segments being in the position illustrated in FIG. 6, the voussoir segments being in that illustrated in FIG. 7, the whole of the drum being visible in FIGS. 3a and 3b. By causing levers 140 to pivot, end parts 103a', 103b' of segments 103a, 103b move radially inward and axially towards each other. At the same time the shoulder moves inward and comes to lie completely below the inner diameter of the bead zone, and the carcass can be removed from building drum 10 and sent for finishing.

Other variants and embodiments of the disclosure may be envisaged without going beyond the scope of the disclosure.

The invention claimed is:

1. A building drum for building a tire, comprising;
 a support,
 a central shaft and an outer circumferential surface coaxial with the axis of rotation of the drum and comprising a principal cylindrical surface axially delimited on both sides by a shoulder extended by a lateral protuberance for receiving a bead of the tire, several segments extending between axial ends together defining the principal cylindrical surface, said segments being divided into first and second groups of adjacent segments mounted to move between an expanded position in which they are circumferentially juxtaposed and a retracted position in which adjacent segments are radially offset, wherein the building drum further comprises adjacent elbow levers, wherein each elbow lever includes a first arm that is pivotally attached to one of the axial ends of a segment in such a manner that, in the expanded position, said first arm extends substantially radially to form one of the shoulders and wherein said elbow lever further includes a second arm that extends axially outward from the first arm at a bend and that is pivotally attached to the support in such a manner that said second arm forms one of the protuberances so that in the expanded position, the second arm of the elbow lever extends axially outward beyond an adjacent one of the axial ends of the attached segment for engaging the bead of the tire.

2. A building drum as set forth in claim 1, further including a positive activator for pivoting each elbow lever about an axis perpendicular to the axis of the drum.

3. A building drum as set forth in claim 1, wherein the segments comprise end parts which can be moved axially and radially between the expanded position in which the principal cylindrical surface of the segments has a diameter and axial length which are greater than those of a second position.

4. A building drum as set forth in claim 3, wherein the segments comprise central parts supported through radial arms by a central collar mounted on the central shaft of the drum and wherein said end parts are mounted so as to slide in relation to the central parts.

5. A building drum as set forth in claim 1, wherein each of said elbow levers is a one-piece rigid part having the general shape of a Z.

6. A building drum as set forth in claim 5, wherein the elbow levers can move by pivoting about an axis perpendicular to the longitudinal axis of the drum when driven by a first pair of collars which can move in translation on the central shaft.

7. A building drum as set forth in claim 6, wherein the first pair of collars includes a first collar that is connected to the first group of segments and a second collar that is connected to the second group of segments.

8. A building drum as set forth in claim 7, further including a collar activator for activating the collars to move in relation to each other.

9. A building drum as set forth in claim 8, wherein said collar activator includes a stop plate of one piece with the first collar and mounted with predetermined axial play in relation to the second collar.

10. A building drum as set forth in claim 9, wherein when collapsing the first and second groups of adjacent segments from the expanded position to the retracted position, the collar activator firstly moves the first collar that is made of one piece with the stop plate and that is connected to the first group of segments, so as to collapse only said first group of segments first, until the stop plate engages the second collar that is connected to the second group of segments, so that the collar activator can further move the first collar and the second collar simultaneously and can thus achieve both the first group of segments and the second group of segments moving radially towards the axis of the drum.

11. A building drum as set forth in claim 7, further comprising a second pair of collars that includes a third collar and a fourth collar which can move in translation on the central shaft, wherein the second pair of collars is mounted at a distance from the first pair of collars on the central shaft, wherein the first collar is connected to one axial end of said first group of segments and the third collar is attached to the other axial end of the first group of segments that the first collar is connected with, and wherein the second collar is connected to one axial end of the second group of segments and the fourth collar is attached to the other axial end of said second group of segments that the second collar is connected with.

12. A building drum as set forth in claim 11, further including a collar activator for activating the first and the third collars to move together and apart symmetrically in relation to each other.

13. A building drum as set forth in claim 1, wherein in the expanded position, the first arm of the elbow levers have a height that is 50 mm or more in the radial direction.

14. A building drum as set forth in claim 1, wherein the first arm and second arm of the elbow lever form an acute angle.

15. A building drum as set forth in claim 1, including a first collar that is attached to the elbow levers on one axial end of one of the groups of segments and a third collar that is attached to the elbow levers on the other axial end of the same group of segments to which the first collar is attached and wherein the first and third collars move axially towards each other in the expanded position and wherein the first and third collars move away from each other in the retracted position.

16. A building drum as set forth in claim 15, wherein one of the collars is mounted to a rod having an adjustable stop for regulating the axial movement of the collar.

\* \* \* \* \*